(12) United States Patent
Islam et al.

(10) Patent No.: US 7,254,686 B2
(45) Date of Patent: Aug. 7, 2007

(54) SWITCHING BETWEEN MIRRORED AND NON-MIRRORED VOLUMES

(75) Inventors: Shah Mohammad Rezaul Islam, Tucson, AZ (US); Thomas Charles Jarvis, Tucson, AZ (US); Matthew Joseph Kalos, Tucson, AZ (US); Robert Akira Kubo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 11/096,317

(22) Filed: Mar. 31, 2005

(65) Prior Publication Data

US 2006/0224849 A1    Oct. 5, 2006

(51) Int. Cl.
*G06F 12/16* (2006.01)
(52) U.S. Cl. ............. 711/162; 711/141; 711/142
(58) Field of Classification Search ........... 711/162, 711/141, 142, 143
See application file for complete search history.

(56) References Cited

U.S. PATENT DOCUMENTS

| | | | |
|---|---|---|---|
| 5,524,234 A * | 6/1996 | Martinez et al. ............ 711/141 |
| 5,742,792 A | 4/1998 | Yanai et al. | |
| 5,933,653 A | 8/1999 | Ofek | |
| 5,987,566 A | 11/1999 | Vishlitzky et al. | |
| 6,014,728 A * | 1/2000 | Baror ................... 711/133 |
| 6,073,209 A | 6/2000 | Bergsten | |
| 6,202,135 B1 | 3/2001 | Kedem et al. | |
| 6,260,125 B1 * | 7/2001 | McDowell ............ 711/162 |
| 6,370,626 B1 | 4/2002 | Gagne et al. | |
| 6,389,459 B1 * | 5/2002 | McDowell ............ 709/216 |
| 6,397,348 B1 | 5/2002 | Styczinski | |
| 6,405,294 B1 | 6/2002 | Hayter | |
| 6,611,896 B1 * | 8/2003 | Mason et al. ............ 711/114 |
| 6,704,837 B2 | 3/2004 | Beardsley et al. | |
| 6,704,839 B2 | 3/2004 | Butterworth et al. | |

* cited by examiner

*Primary Examiner*—Jack A. Lane
(74) *Attorney, Agent, or Firm*—Rabindranath Dutta; Konrad Raynes & Victor LLP

(57) ABSTRACT

Provided are a method, system, and article of manufacture, wherein a request is received for switching a logical volume from one state to another state, wherein the logical volume is in a mirrored state if data corresponding to the logical volume is mirrored from a first storage to a second storage, and wherein the logical volume is in a non-mirrored state if the data corresponding to the logical volume is not mirrored from the first storage to the second storage. A determination is made as to whether to perform the switching, in response to receiving the request.

31 Claims, 6 Drawing Sheets

SWITCHING BETWEEN MIRRORED AND NON-MIRRORED VOLUMES

BACKGROUND

1. Field

The disclosure relates to a method, system, and article of manufacture for the storage of data in cache and non-volatile media.

2. Background

Storage subsystems, such as the International Business Machines ("IBM") Enterprise Storage Server*, may receive Input/Output (I/O) requests from one or more hosts directed toward an attached media storage system. The attached media storage system may comprise an enclosure including numerous interconnected disk drives, such as a Direct Access Storage Device ("DASD"), a Redundant Array of Independent Disks ("RAID" Array), Just A Bunch of Disks ("JBOD"), etc.

The storage subsystem may have a cache comprising of one or more gigabytes of volatile storage, e.g., Random Access Memory (RAM), Dynamic Random Access Memory (DRAM), etc. The storage subsystem may store modified data, i.e., write data, in the cache. The cache may need to be scanned periodically, and subsequent to scanning data in the cache may be destaged, i.e., moved or copied, to the disk drives from the cache.

A non-volatile storage that is battery backed may be coupled to the storage subsystem. In the event of a power failure, data that is stored in the cache may be lost, but if the data in the cache is mirrored to the non-volatile storage then the data that was stored in the cache may be retrieved.

A storage subsystem that includes a cache may be referred to as a caching storage controller. Caching storage controllers may adopt different mechanisms to cache write data received from a host. In one mechanism, the host is not notified of write completion until data is written to both the cache and the non-volatile storage. In another mechanism, the non-volatile storage may not be used, and the host is notified of a write completion when the data is written to the cache. While writing to both the cache and the non-volatile storage provides redundant storage of data and may be better from an error recovery perspective, writing data only to the cache may allow for better performance in the storage controller by reducing the number of writes that are performed.

SUMMARY OF THE DESCRIBED EMBODIMENTS

Provided are a method, system, and article of manufacture, wherein a request is received for switching a logical volume from one state to another state, wherein the logical volume is in a mirrored state if data corresponding to the logical volume is mirrored from a first storage to a second storage, and wherein the logical volume is in a non-mirrored state if the data corresponding to the logical volume is not mirrored from the first storage to the second storage. A determination is made as to whether to perform the switching, in response to receiving the request.

In additional embodiments, the determination further comprises preventing the switching in response to a failure of a destage scan to commit to a media storage on all previously non-mirrored writes to the logical volume if the one state is the non-mirrored state and the another state is the mirrored state. Also, the switching is prevented in response to a failure of the destage scan to commit to the media storage on all previously mirrored writes to the logical volume, if the one state is the mirrored state and the another state is the non-mirrored state;

In yet additional embodiments, the one state is the non-mirrored state and the another state is the mirrored state. An initiating of mirroring of new writes to the logical volume is performed subsequent to the receiving of the request for the switching. A destage scan is initiated to commit to a media storage previously non-mirrored writes to the logical volume, wherein the previously non-mirrored writes were received before the new writes. The switching of the logical volume from the non-mirrored state to the mirrored state is prevented and the mirroring of the new writes is stopped, in response to a failure of the commit. The switching of the logical volume from the non-mirrored state to the mirrored state is allowed, in response to a successful completion of the commit.

In further embodiments, the one state is a mirrored state and the another state is the non-mirrored state. Mirroring of new writes to the logical volume is continued, subsequent to the receiving of the request for the switching. A destage scan to commit to a media storage previously mirrored writes to the logical volume is initiated, wherein the previously non-mirrored writes were received before the new writes. The switching of the logical volume from the mirrored state to the non-mirrored state, in which additional writes are not mirrored, is prevented, in response to a failure of the commit. The switching of the logical volume from the mirrored state to the non-mirrored state is allowed and the mirroring of the new writes is stopped, in response to a successful completion of the commit.

In still further embodiments, the logical volume is not allowed to switch state until the switching can be done without a potential for losing data, wherein the potential for losing data includes an inability to destage the data from the first storage to a media storage that is persistent.

In additional embodiments, write requests to the logical volume received during a time period in which the switching is being attempted to be performed are mirrored.

In still additional embodiments, the first storage loses data in response to a power failure, wherein the second storage is backed up by battery to prevent data loss in response to the power failure.

In further embodiments, the first storage is a cache, the second storage is a non-volatile storage, wherein the receiving and the determining are implemented in a storage controller.

The still further embodiments, the first storage is a cache, the second storage is a non-volatile storage, wherein the receiving and the determining are implemented in a host, and a controller that supports a commit scan of the cache to a media storage.

In additional embodiments, the request for switching is received at a storage controller from a host, wherein the storage controller is coupled to the first storage and the second storage, wherein the data corresponding to the logical volume is capable of being stored in the first storage and the second storage, and wherein write requests from the host are stored at least in the first storage.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In certain systems, there does not exist any standardized commands to indicate whether write data should be stored both in the cache and in the non-volatile storage, or should be stored only in the cache. The storing of write data both in the cache and the non-volatile storage may be referred to as a mirrored mode operation of the storage controller, whereas the storing of write data only in the cache may be referred to as a non-mirrored mode operation of the storage controller.

When a user completes a switch of a logical volume in the storage controller from a non-mirrored mode to a mirrored mode, the user may expect that new writes to the cache would be mirrored to the non-volatile storage. However, even though new writes would be mirrored when the logical volume is in the mirrored mode, there may be non-mirrored writes that arrived during the time period in which the mode was in the process of being switched and these non-mirrored writes may not have been destaged, i.e., moved from the transient cache to persistent media storage. If there is a loss of the data in the cache, the user may lose the non-mirrored write data. Additionally, if a switch from a mirrored mode to a non-mirrored mode fails, a user may be left with non-mirrored writes in the cache.

Certain embodiments force data in the cache to be destaged to media storage before successfully completing a switch from a mirrored to a non-mirrored mode, or from a non-mirrored to a mirrored mode.

Figure 1:
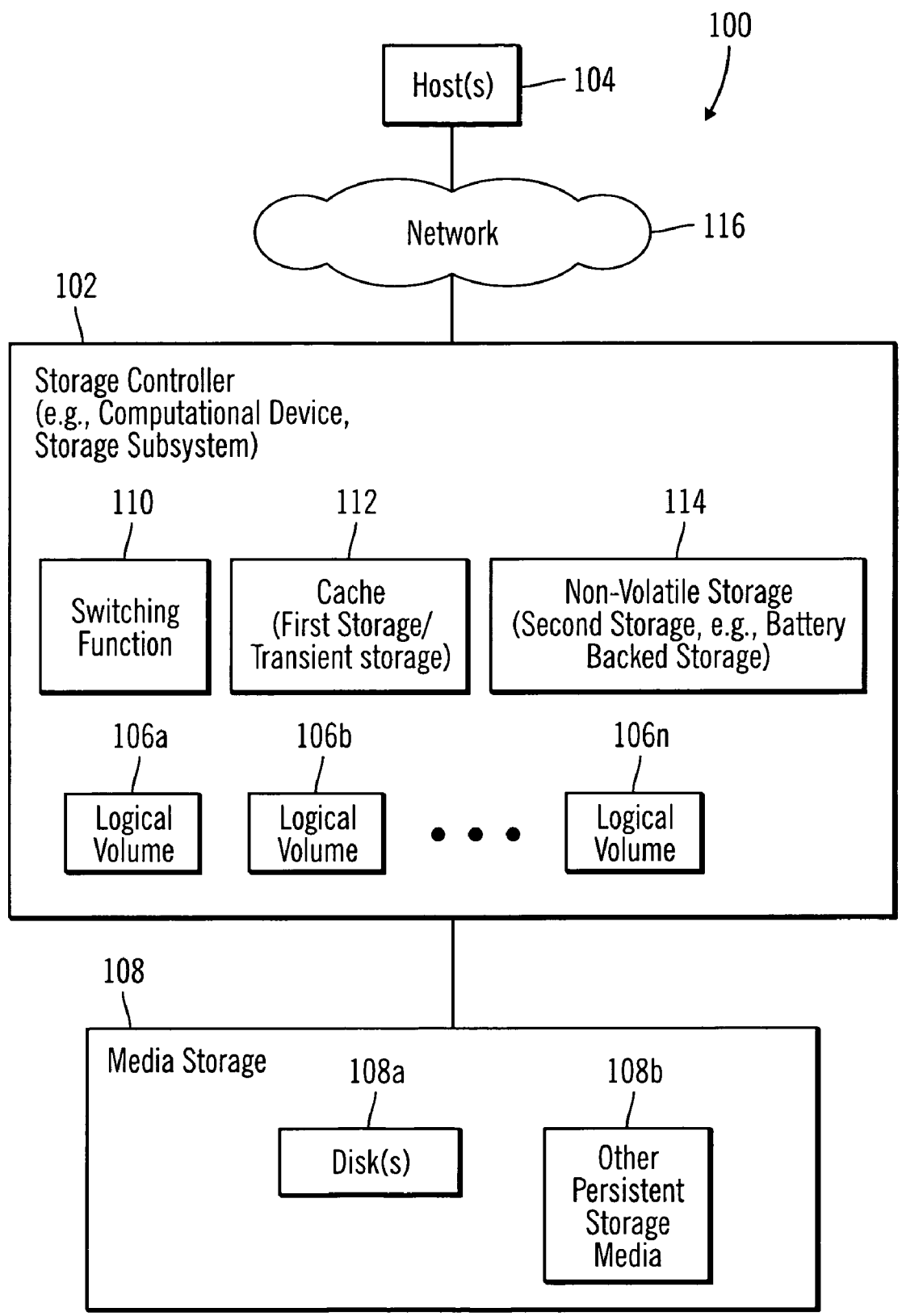
FIG. 1 illustrates a block diagram of a computing environment in accordance with certain embodiments.

FIG. 1 illustrates a computing environment 100 in which certain embodiments are implemented. A storage controller 102 that may be referred to as a storage subsystem, receives I/O requests from one or more hosts 104, where the I/O requests are directed towards operations to be performed on one or more logical volumes 106a, 106b, . . . , 106n. The logical volumes 106a . . . 106n may correspond to physical volumes (not shown) stored in a media storage 108 that may be comprised of disks 108a and other storage media 108b.

The storage controller 102 further includes a switching function 110, a cache 112, and a non-volatile storage 114. The switching function 110 allows the logical volumes 106a . . . 106n to be switched from one state to another, where the states may comprise a mirrored state and a non-mirrored state. If a logical volume is in a mirrored state data corresponding to a write operation directed towards the logical volume is written to the cache 112 and copied or substantially simultaneously written, i.e., mirrored, to the non-volatile storage. If a logical volume is maintained in a non-mirrored state then data corresponding to a write operation directed towards a logical volume is written to the cache 112 but is not mirrored to the non-volatile storage 114.

The cache 112 comprises a volatile memory to physically store at least some data corresponding to the logical volumes 106a . . . 106n. The cache 112 may be implemented in one or more volatile memory devices, such as, RAM. In the event of a power failure the data stored in the cache 112 may be lost. The non-volatile memory 112 is any suitable memory whose data is not lost in the event of a power failure. For example, in certain embodiments the non-volatile memory 112 may be supplied with backup power from a battery and as a result the non-volatile memory 112 may retain data in the event of a power failure. Although the cache 112 and the non-volatile memory 114 have been shown inside the storage controller 102, the cache 112 and/or the non-volatile memory 114 may reside outside the storage controller 102 and be coupled to the storage controller 102.

The hosts 104 may communicate I/O requests to the storage subsystem 102 via a network 116, which may comprise any suitable network presently known in the art, such as a Storage Area Network (SAN), Local Area Network (LAN), Wide Area Network (WAN), the Internet, an Intranet, etc.

In certain embodiments, the storage controller 102 may comprise any suitable computational device, including those presently known in the art, such as, a personal computer, a workstation, a mainframe, a midrange computer, a network appliance, a palm top computer, a telephony device, a blade computer, a hand held computer, etc. While FIG. 1 shows only one host 104 coupled to one storage subsystem 102, in alternative embodiments a plurality of hosts may be coupled to a plurality of storage subsystems.

Therefore FIG. 1 illustrates certain embodiments, in which the storage controller 102 maintains the logical volumes 106a . . . 106n in a mirrored or non-mirrored state.

Figure 2:
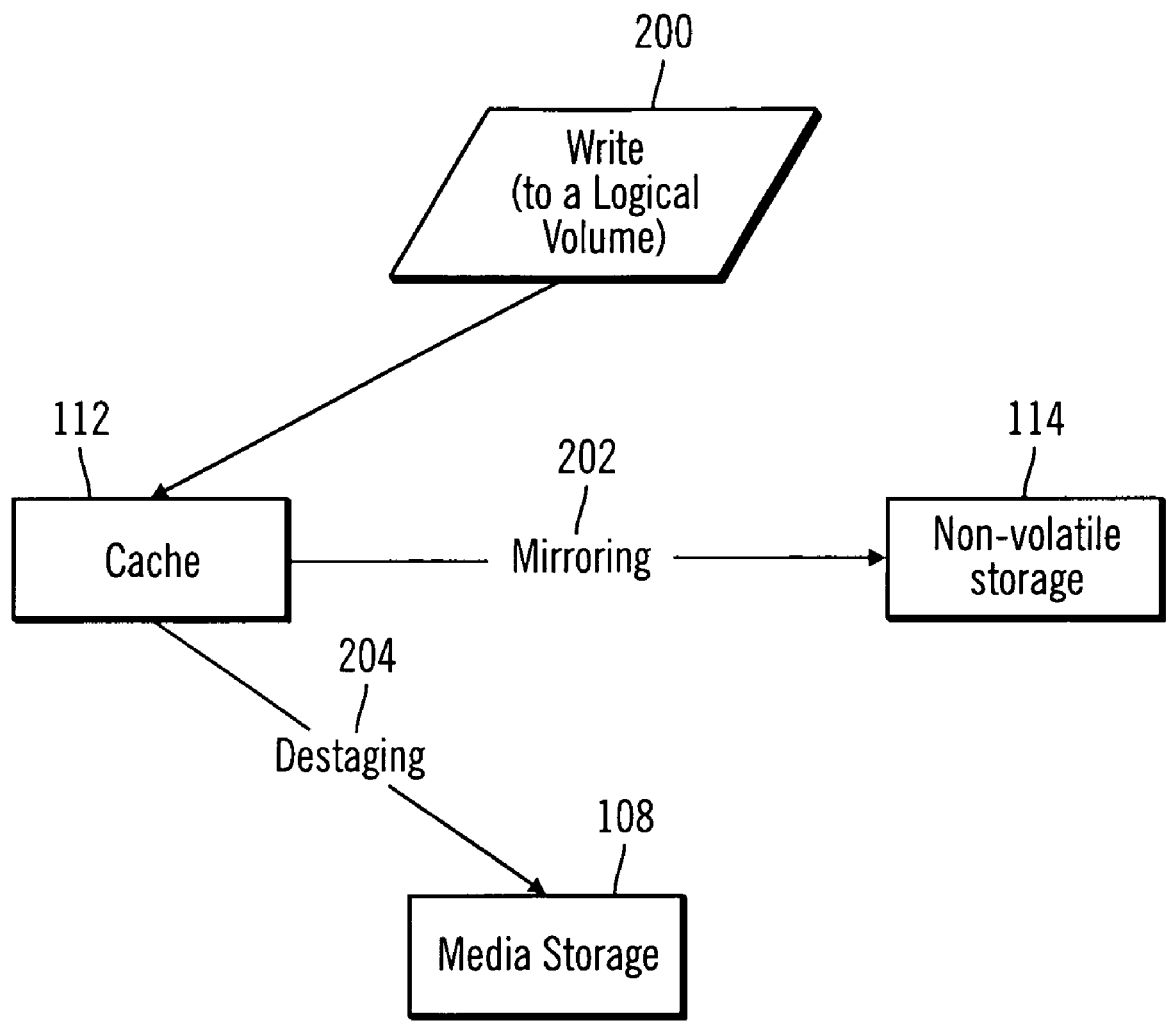
FIG. 2 illustrates a block diagram of mirroring and destaging of data, in accordance with certain embodiments.

FIG. 2 illustrates a block diagram of the mirroring and destaging of data in the computing environment 100, in accordance with certain embodiments.

The host 104 may generate a write request 200 directed at a logical volume, such as, logical volume 106a in the storage controller 102. In certain embodiments, in which the logical volume is to be kept in a mirrored state, the write request 200 causes a writing of data corresponding to the logical volume in the cache 112 and causes a mirroring 202 of the data to the non-volatile storage 114. In certain other embodiments, in which the logical volume is to be kept in a non-mirrored state, the write request causes a writing of data corresponding to the logical volume in the cache 112 but does cause a mirroring 202 of the data to the non-volatile storage.

In certain embodiments, a user may change the state of a logical volume from one stage to another. For example, the user may change the state of a logical volume from a mirrored state to a non-mirrored state or from a non-mirrored state to a mirrored state. In certain embodiments, when the state of a logical volume is changed, i.e., switched, the storage controller 102 may destage 204 data from the cache 112 to the media storage 108 before completing the switching of the state of the logical volume.

Therefore, FIG. 2 illustrates certain embodiments in which data is destaged from the cache to the media storage 108 before the switching of the state of a logical volume. The storage controller 102 may respond to a user according to the state of a logical unit expected by the user before, during, and after the completion of the switching of the state of a logical volume. Additionally, during the period in which a logical volume is being switched from one state to another the potential for data loss is reduced by destaging data stored transiently in the cache 112 to the persistent media storage 108.

Figure 3:
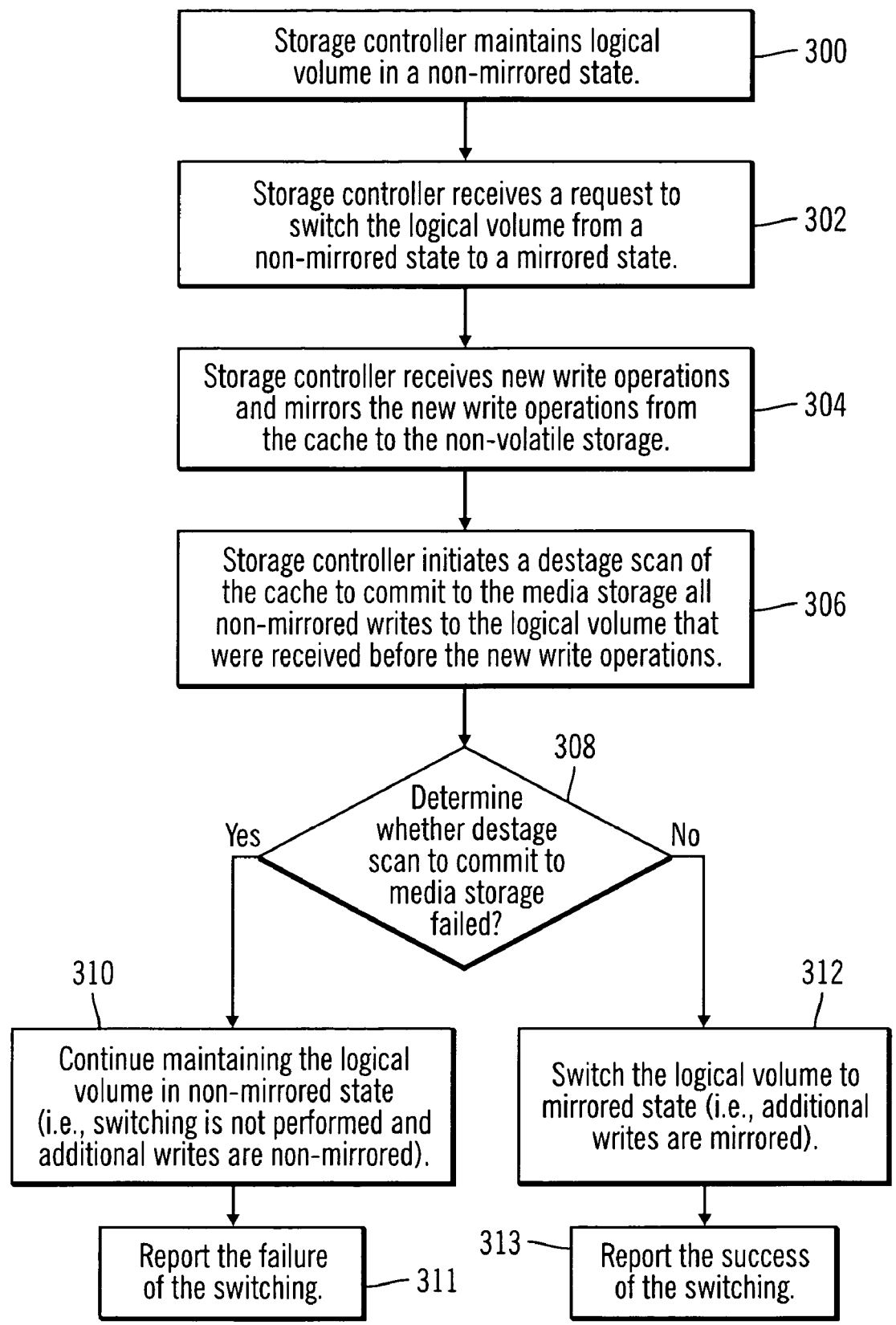
FIG. 3 illustrates operations for switching from a non-mirrored state to a mirrored state, in accordance with certain embodiments.

FIG. 3 illustrates operations for switching from a non-mirrored state to a mirrored state, in accordance with certain embodiments. In certain embodiments, the operations may be implemented in the storage controller 102 via the switching function 110.

Control starts at block 300, where the storage controller 102 maintains a logical volume in a non-mirrored state in which the data corresponding to the logical volume is stored in the cache 112 and is not mirrored to the non-volatile storage 114.

The storage controller 102 receives (at block 302) a request to switch the logical volume from a non-mirrored state to a mirrored state.

During the time the storage controller 102 is attempting to switch the state of the logical volume, the storage controller 102 receives (at block 304) new write operations and mirrors the new write operations from the cache 112 to the non-volatile storage 114. Since a user expects the logical volume to be mirrored after switching, an attempt is made by the storage controller 102 to start mirroring data for the logical volume from the cache 112 to the non-volatile storage 114 even before the switching of the state of the logical volume is complete. Should the switching be unsuccessful, some additional mirrored data may be present in the non-volatile storage 114.

The storage controller 102 initiates (at block 306) a destage scan of the cache 112 to commit to the media storage 108 all non-mirrored writes to the logical volume that were received before the new write operations. During the destage scan of the cache 112, the cache 112 may be examined for data corresponding to the logical volume by traversing through cache directory entries corresponding to the cache 112, and the data corresponding to the logical volume may be destaged, i.e., copied or moved, to the media storage 108. The committing to the media storage 108 is successful if the data is destaged successfully to the media storage 108, otherwise the committing to the media storage 108 fails. Therefore, the storage controller 102 attempts to destage the non-mirrored writes that were received when the logical volume was in a non-mirrored state to the media storage 108 where the non-mirrored writes can be stored persistently as opposed to being stored transiently in the cache 112. The risk of data loss of the non-mirrored data in the cache 112 is avoided if the committing to the media storage 112 is successful.

The storage controller 102 determines (at block 308) whether the destage scan to commit to the media storage 108 failed. If so, then the storage controller 102 continues (at block 310) to maintain the logical volume in the non-mirrored state, i.e., switching of state is not performed and additional writes to the logical volume are non-mirrored. The storage controller 102 may report (at block 311) the failure of the switching to a user. While some mirrored write data may be present in the cache 112 that does not pose any problem for a user. Therefore, certain embodiments prevent a logical volume from being changed from a non-mirrored state to a mirrored state unless all the non-mirrored writes corresponding to the logical volume are destaged from the cache 112 to the media storage 108.

If the storage controller 102 determines (at block 308) the destage scan to commit to the media storage 108 has been successful, then the storage controller 102 switches (at block 312) the logical volume to a mirrored state, i.e., additional writes to the logical volume are mirrored. The storage controller 102 may then report (at block 313) the success of the switching to a user.

Therefore, FIG. 3 illustrates certain embodiments in which the storage controller 102 allows a logical volume to be switched from a non-mirrored state to a mirrored state only if all non-mirrored writes corresponding to the logical volume that are stored transiently in the cache 112 are destaged to the persistent media storage 108. The loss of data is avoided once the non-mirrored writes are stored persistently in the media storage 108.

Figure 4:
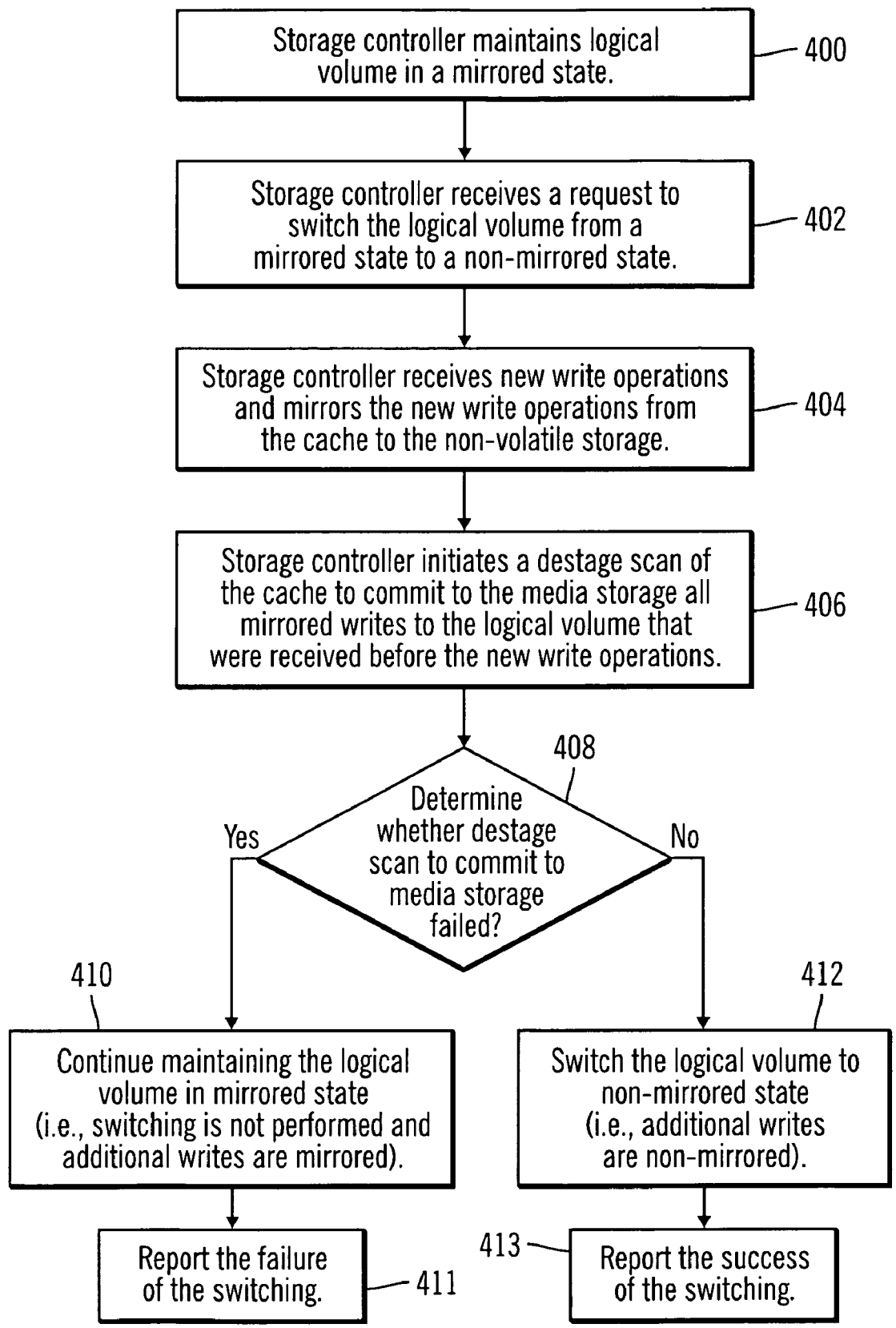
FIG. 4 illustrates operations for switching from a mirrored to a non-mirrored state, in accordance with certain embodiments.

FIG. 4 illustrates operations for switching from a mirrored to a non-mirrored state, in accordance with certain embodiments. In certain embodiments, the operations may be implemented in the storage controller 102 via the switching function 110.

Control starts at block 400, where the storage controller 102 maintains a logical volume in a mirrored state, i.e., writes to the logical volume are mirrored from the cache 112 to the non-volatile storage 114.

The storage controller 102 receives (at block 402) a request to switch the logical volume from the mirrored state to a non-mirrored state. While the storage controller 102 is attempting to perform the switch, the storage controller 102 may receive new write operations. The storage controller 102 mirrors (at block 404) the new write operations from the cache 112 to the non-volatile storage 114. Therefore, even if the switching to the non-mirrored state fails, the expectation of a user that a logical volume in the mirrored state has mirrored data stored in the non-volatile storage 114 is satisfied.

The storage controller 102 initiates (at block 406) a destage scan of the cache 112 to commit to the media storage 114 the mirrored writes to the logical volume that were received before the new write operations. Therefore, prior to switching the state to being non-mirrored, the storage controller 102 attempts to destage the already mirrored writes to the persistent media storage 108.

The storage controller 102 determines (at block 408) whether the destage scan to commit to the media storage 108 failed. If so, storage controller 102 continues (at block 410) to maintain the logical volume in a mirrored state. Therefore, no switching of state is performed and additional writes are mirrored. The storage controller 102 may then report (at block 411) the failure of the switching to a user.

If the storage controller 102 determines (at block 408) that the destage scan to commit to the media storage 108 has been successful, then the storage controller 102 switches (at block 412) the logical volume to a non-mirrored state, and additional writes are non-mirrored. The storage controller 102 may then report (at block 413) the success of the switching to a user.

Therefore, FIG. 4 illustrates certain embodiments in which the storage controller allows a logical volume to be switched from a mirrored state to a non-mirrored state only if all mirrored writes corresponding to the logical volume that are stored transiently in the cache 112 are destaged to the media storage 108.

Figure 5:
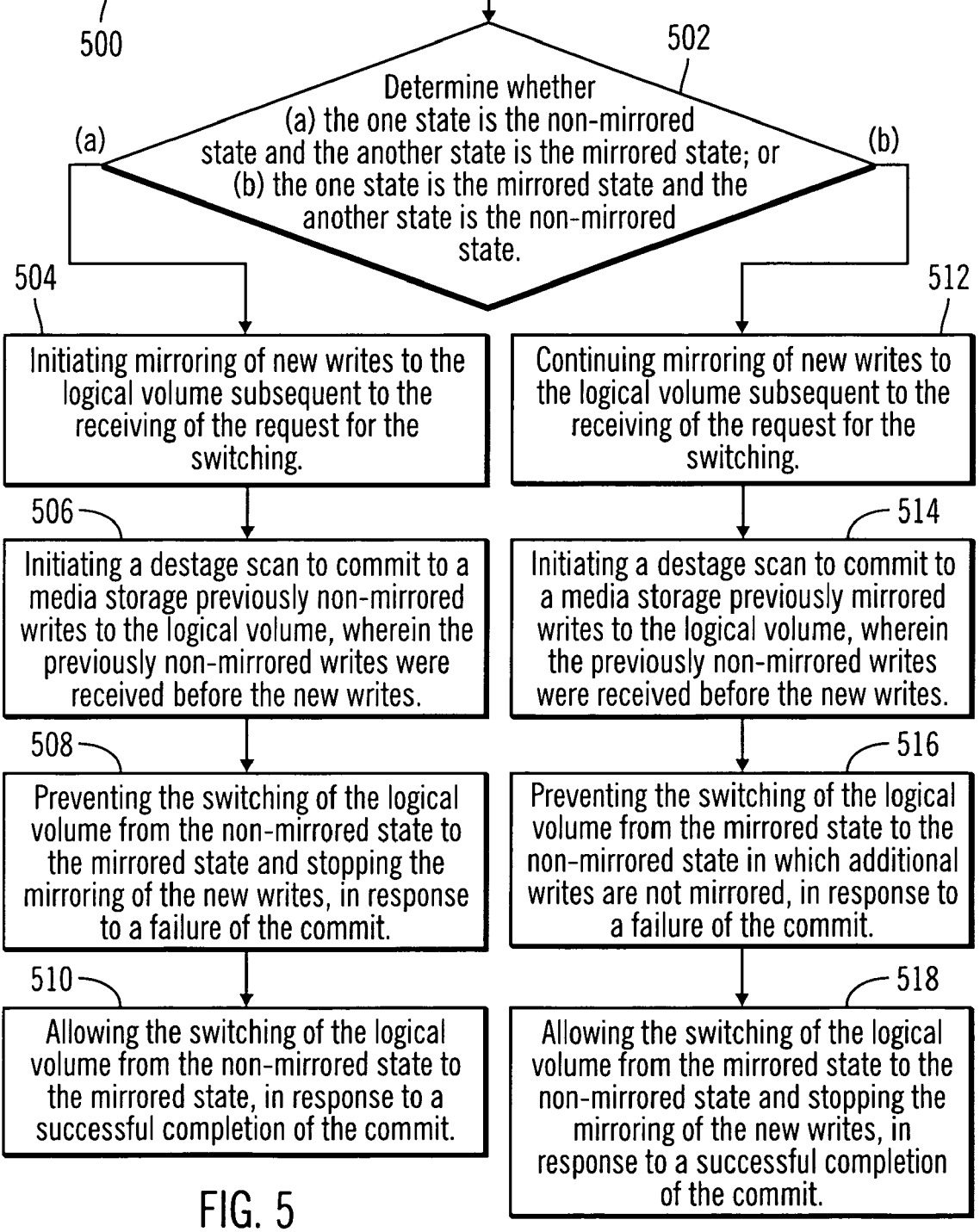
FIG. 5 illustrates operations for processing switching requests in a storage controller, in accordance with certain embodiments.

FIG. 5 illustrates operations for processing switching requests in a storage controller 102, in accordance with certain embodiments. In certain exemplary embodiments, the operations may be implemented in the storage controller 102 via the switching function 110.

Control starts at block 500, where the storage controller 102 receives a request for switching a logical volume from one state to another state, wherein the logical volume is in a mirrored state if data in the logical volume is mirrored from a first storage 112 to a second storage 114, and wherein the logical volume is in a non-mirrored state if the data the logical volume is not mirrored from the first storage 112 to the second storage 114. In certain exemplary embodiments, the first storage 112 is a cache, and the second storage is a non-volatile storage.

The storage controller 102 determines (at block 502) whether: (a) the one state is the non-mirrored state and the another state is the mirrored state; or (b) the one state is the mirrored state and the another state is the non-mirrored state.

If the storage controller 102 determines that the one state is the non-mirrored state and the another state is the mirrored stage, i.e., the request is for switching from a non-mirrored state to a mirrored state, then the storage controller 102 initiates (at block 504) mirroring of new writes to the logical volume subsequent to the receiving of the request for the switching.

The storage controller 102 initiates (at block 506) a destage scan to commit to a media storage 108 all previously non-mirrored writes to the logical volume, wherein all the previously non-mirrored writes were received before the new writes.

The storage controller 102 prevents (at block 508) the switching of the logical volume from the non-mirrored state to the mirrored state and stops the mirroring of the new writes, in response to a failure of the commit. The storage controller 102 allows (at block 510) the switching of the logical volume from the non-mirrored state to the mirrored state, in response to a successful completion of the commit.

If at block 502, the storage controller 102 determines that the one state is the mirrored state and the another state is the non-mirrored stage, i.e., the request is for switching from a mirrored to a non-mirrored stage, then the storage controller 102 continues (at block 512) mirroring of new writes to the logical volume subsequent to the receiving of the request for the switching.

The storage controller 102 initiates (at block 514) a destage scan to commit to a media storage 108 previously mirrored writes to the logical volume, wherein the previously non-mirrored writes were received before the new writes.

The storage controller 102 prevents (at block 516) the switching of the logical volume from the mirrored state to the non-mirrored state, in response to a failure of the commit. The storage controller 102 allows (at block 518) the switching of the logical volume from the mirrored state to the non-mirrored state and stops the mirroring of the new writes, in response to a successful completion of the commit.

Therefore, FIG. 5 illustrates certain embodiments in which the storage controller 102 prevents the switching from a non-mirrored state to a mirrored state, in response to a failure of a destage scan to commit to a media storage 108 on previously non-mirrored writes corresponding to a logical volume. Additionally, the storage controller 102 prevents the switching from a mirrored state to a non-mirrored state, in response to a failure of a destage scan to commit to a media storage on previously mirrored writes corresponding to a logical volume.

In certain embodiments, a logical volume is not allowed to switch state until the switching can be done without a potential for losing data, wherein the potential for losing data includes an inability to destage the data stored transiently in a cache to a media storage that is persistent.

While the switching is performed in certain embodiments by the storage controller, in alternative embodiments the switching may be performed by a host, where a storage controller supports a commit scan of a cache to a media storage.

Certain embodiments force all data to be destaged before successfully completing a switch between a mirrored to a non-mirrored state, or from a non-mirrored to a mirrored state. As a result, the possibility of inadvertent data loss is reduced, when compared to situations where all data is not forced to be destaged before successfully completing a switch between states.

In certain embodiments the storage controller, by reporting the failure or success of a switching operation, provides a guarantee for a user that if a volume is in the mirrored state there are no unmirrored tracks corresponding to the volume in the cache.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a tangible medium, where such tangible medium may comprise hardware logic [e.g., an integrated circuit chip, Programmable Gate Array (PGA), Application Specific Integrated Circuit (ASIC), etc.] or a computer readable medium, such as, magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The tangible medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of the embodiments, and that the article of manufacture may comprise any information bearing medium. For example, the article of manufacture may comprise a storage medium having stored therein instructions that when executed by a machine results in operations being performed.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
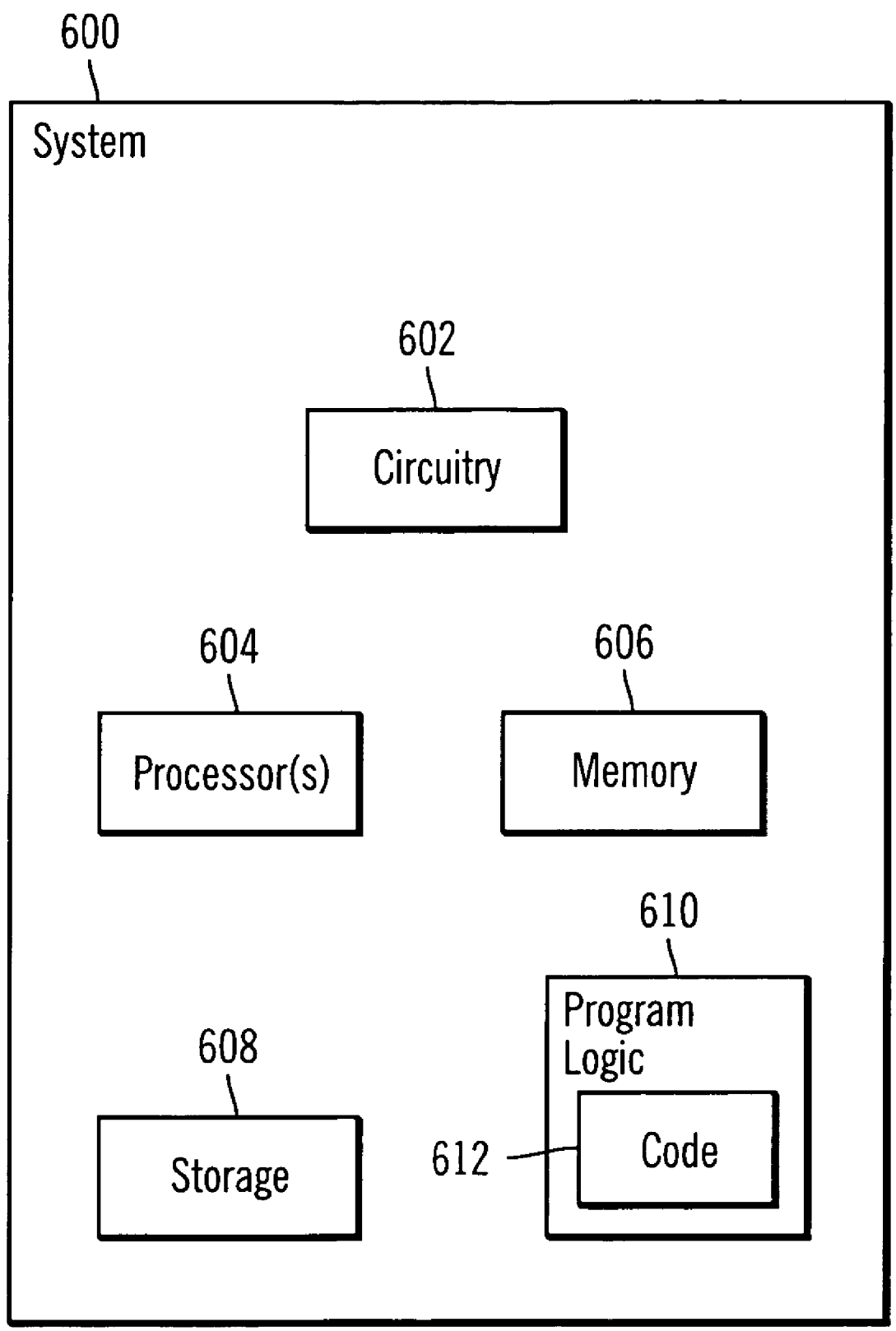
FIG. 6 illustrates a system in which certain embodiments are implemented.

FIG. 6 illustrates a block diagram of a system 600 in which certain embodiments may be implemented. In certain embodiments, the storage controller 102 may be implemented in accordance with the system 600. The system 600 may include a circuitry 602 that may in certain embodiments include a processor 604. The system 600 may also include a memory 606 (e.g., a volatile memory device), and storage 608. Certain elements of the system 600 may or may not be found in the storage controller 102. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIG. 6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

receiving a request for switching a logical volume from one state to another state, wherein the logical volume is in a mirrored state if data corresponding to the logical volume is mirrored from a first storage to a second storage, and wherein the logical volume is in a non-mirrored state if the data corresponding to the logical volume is not mirrored from the first storage to the second storage; and determining whether to perform the switching, in response to receiving the request, wherein the logical volume is not allowed to switch state until the switching can be done without a potential for losing data, and wherein the potential for losing data includes an inability to destage the data from the first storage to a media storage that is persistent.

2. The method of claim 1, wherein the determining further comprises:

preventing the switching in response to a failure of a destage scan to commit to the media storage on all previously non-mirrored writes to the logical volume if the one state is the non-mirrored state and the another state is the mirrored state;

preventing the switching in response to a failure of the destage scan to commit to the media storage on all previously mirrored writes to the logical volume if the one state is the mirrored state and the another state is the non-mirrored state.

3. The method of claim 1, wherein the one state is the non-mirrored state and the another state is the mirrored state, the method further comprising:

initiating mirroring of new writes to the logical volume subsequent to the receiving of the request for the switching;

initiating a destage scan to commit to the media storage previously non-mirrored writes to the logical volume, wherein the previously non-mirrored writes were received before the new writes;

preventing the switching of the logical volume from the non-mirrored state to the mirrored state and stopping the mirroring of the new writes, in response to a failure of the commit; and allowing the switching of the logical volume from the non-mirrored state to the mirrored state, in response to a successful completion of the commit.

4. The method of claim 1, wherein the one state is a mirrored state and the another state is the non-mirrored state, the method further comprising:
- continuing mirroring of new writes to the logical volume subsequent to the receiving of the request for the switching;
- initiating a destage scan to commit to the media storage previously mirrored writes to the logical volume, wherein the previously non-mirrored writes were received before the new writes;
- preventing the switching of the logical volume from the mirrored state to the non-mirrored state in which additional writes are not mirrored, in response to a failure of the commit; and
- allowing the switching of the logical volume from the mirrored state to the non-mirrored state and stopping the mirroring of the new writes, in response to a successful completion of the commit.

5. The method of claim 1, wherein write requests to the logical volume received during a time period in which the switching is being attempted to be performed are mirrored.

6. The method of claim 1, wherein the first storage loses data in response to a power failure, and wherein the second storage is backed up by battery to prevent data loss in response to the power failure.

7. The method of claim 1, wherein the first storage is a cache, the second storage is a non-volatile storage, and wherein the receiving and the determining are implemented in a storage controller.

8. The method of claim 1, wherein the first storage is a cache, the second storage is a non-volatile storage, and wherein the receiving and the determining are implemented in a host, and a controller that supports a commit scan of the cache to the media storage.

9. The method of claim 1, wherein the request for switching is received at a storage controller from a host, wherein the storage controller is coupled to the first storage and the second storage, wherein the data corresponding to the logical volume is capable of being stored in the first storage and the second storage, and wherein write requests from the host are stored at least in the first storage.

10. A system, comprising:
- (a) memory;
- (b) first storage coupled to the memory;
- (c) second storage coupled to the memory;
- (d) processor coupled to the memory, wherein the processor is capable of performing operations, the operations comprising:
  - (i) receiving a request for switching a logical volume from one state to another state, wherein the logical volume is in a mirrored state if data corresponding to the logical volume is mirrored from the first storage to the second storage, and wherein the logical volume is in a non-mirrored state if the data corresponding to the logical volume is not mirrored from the first storage to the second storage; and
  - (ii) determining whether to perform the switching, in response to receiving the request; and
- (e) a media storage that is persistent, wherein the logical volume is not allowed to switch state until the switching can be done without a potential for losing data, and wherein the potential for losing data includes an inability to destage the data from the first storage to the media storage.

11. The system of claim 10, wherein the determining further comprises:
- preventing the switching in response to a failure of a destage scan to commit to the media storage on all previously non-mirrored writes to the logical volume if the one state is the non-mirrored state and the another state is the mirrored state;
- preventing the switching in response to a failure of the destage scan to commit to the media storage on all previously mirrored writes to the logical volume if the one state is the mirrored state and the another state is the non-mirrored state.

12. The system of claim 10, wherein the one state is the non-mirrored state and the another state is the mirrored state, the operations further comprising:
- initiating mirroring of new writes to the logical volume subsequent to the receiving of the request for the switching;
- initiating a destage scan to commit to the media storage previously non-mirrored writes to the logical volume, wherein the previously non-mirrored writes were received before the new writes;
- preventing the switching of the logical volume from the non-mirrored state to the mirrored state and stopping the mirroring of the new writes, in response to a failure of the commit; and
- allowing the switching of the logical volume from the non-mirrored state to the mirrored state, in response to a successful completion of the commit.

13. The system of claim 10, wherein the one state is a mirrored state and the another state is the non-mirrored state, the operations further comprising:
- continuing mirroring of new writes to the logical volume subsequent to the receiving of the request for the switching;
- initiating a destage scan to commit to the media storage previously mirrored writes to the logical volume, wherein the previously non-mirrored writes were received before the new writes;
- preventing the switching of the logical volume from the mirrored state to the non-mirrored state in which additional writes are not mirrored, in response to a failure of the commit; and
- allowing the switching of the logical volume from the mirrored state to the non-mirrored state and stopping the mirroring of the new writes, in response to a successful completion of the commit.

14. The system of claim 10, wherein write requests to the logical volume received during a time period in which the switching is being attempted to be performed are mirrored.

15. The system of claim 10, wherein the first storage loses data in response to a power failure, and wherein the second storage is backed up by battery to prevent data loss in response to the power failure.

16. The system of claim 10, wherein the first storage is a cache, the second storage is a non-volatile storage, and wherein the receiving and the determining are implemented in a storage controller.

17. The system of claim 10, wherein the first storage is a cache, the second storage is a non-volatile storage, and wherein the receiving and the determining are implemented in a host, and a controller that supports a commit scan of the cache to the media storage.

18. The system of claim 10, wherein the request for switching is received at a storage controller from a host, wherein the storage controller is coupled to the first storage and the second storage, wherein the data corresponding to the logical volume is capable of being stored in the first storage and the second storage, and wherein write requests from the host are stored at least in the first storage.

19. A computer readable storage medium including code, wherein the code is capable of causing operations in a machine coupled to a first storage and a second storage, the operations comprising:

receiving a request for switching a logical volume from one state to another state, wherein the logical volume is in a mirrored state if data corresponding to the logical volume is mirrored from the first storage to the second storage, and wherein the logical volume is in a non-mirrored state if the data corresponding to the logical volume is not mirrored from the first storage to the second storage; and determining whether to perform the switching, in response to receiving the requests, wherein the logical volume is not allowed to switch state until the switching can be done without a potential for losing data, and wherein the potential for losing data includes an inability to destage the data from the first storage to a media storage that is persistent.

20. The computer readable storage medium of claim 19, wherein the determining further comprises:

preventing the switching in response to a failure of a destage scan to commit to the media storage on all previously non-mirrored writes to the logical volume if the one state is the non-mirrored state and the another state is the mirrored state;

preventing the switching in response to a failure of the destage scan to commit to the media storage on all previously mirrored writes to the logical volume if the one state is the mirrored state and the another state is the non-mirrored state.

21. The computer readable storage medium of claim 19, wherein the one state is the non-mirrored state and the another state is the mirrored state, the operations further comprising:

initiating mirroring of new writes to the logical volume subsequent to the receiving of the request for the switching;

initiating a destage scan to commit to the media storage previously non-mirrored writes to the logical volume, wherein the previously non-mirrored writes were received before the new writes;

preventing the switching of the logical volume from the non-mirrored state to the mirrored state and stopping the mirroring of the new writes, in response to a failure of the commit; and allowing the switching of the logical volume from the non-mirrored state to the mirrored state, in response to a successful completion of the commit.

22. The computer readable storage medium of claim 19, wherein the one state is a mirrored state and the another state is the non-mirrored state, the operations further comprising:

continuing mirroring of new writes to the logical volume subsequent to the receiving of the request for the switching;

initiating a destage scan to commit to the media storage previously mirrored writes to the logical volume, wherein the previously non-mirrored writes were received before the new writes;

preventing the switching of the logical volume from the mirrored state to the non-mirrored state in which additional writes are not mirrored, in response to a failure of the commit; and allowing the switching of the logical volume from the mirrored state to the non-mirrored state and stopping the mirroring of the new writes, in response to a successful completion of the commit.

23. The computer readable storage medium of claim 19, wherein write requests to the logical volume received during a time period in which the switching is being attempted to be performed are mirrored.

24. The computer readable storage medium of claim 19, wherein the first storage loses data in response to a power failure, and wherein the second storage is backed up by battery to prevent data loss in response to the power failure.

25. The computer readable storage medium of claim 19, wherein the first storage is a cache, the second storage is a non-volatile storage, and wherein the receiving and the determining are implemented in a storage controller.

26. The computer readable storage medium of claim 19, wherein the first storage is a cache, the second storage is a non-volatile storage, and wherein the receiving and the determining are implemented in a host, and a controller that supports a commit scan of the cache to the media storage.

27. The computer readable storage medium of claim 19, wherein the request for switching is received at a storage controller from a host, wherein the storage controller is coupled to the first storage and the second storage, wherein the data corresponding to the logical volume is capable of being stored in the first storage and the second storage, and wherein write requests from the host are stored at least in the first storage.

28. A method for deploying computing infrastructure, comprising integrating computer-readable code into a computing system, wherein the code in combination with the computing system is capable of performing:

receiving a request for switching a logical volume from one state to another state, wherein the logical volume is in a mirrored state if data corresponding to the logical volume is mirrored from a first storage to a second storage, and wherein the logical volume is in a non-mirrored state if the data corresponding to the logical volume is not mirrored from the first storage to the second storage; and determining whether to perform the switching, in response to receiving the request, wherein the logical volume is not allowed to switch state until the switching can be done without a potential for losing data, and wherein the potential for losing data includes an inability to destage the data from the first storage to a media storage that is persistent.

29. The method of claim 28, wherein the determining further comprises:

preventing the switching in response to a failure of a destage scan to commit to the media storage on all previously non-mirrored writes to the logical volume if the one state is the non-mirrored state and the another state is the mirrored state;

preventing the switching in response to a failure of the destage scan to commit to the media storage on all previously mirrored writes to the logical volume if the one state is the mirrored state and the another state is the non-mirrored state.

30. The method of claim 28, wherein the one state is the non-mirrored state and the another state is the mirrored state, wherein the code in combination with the computing system is further capable of performing:

initiating mirroring of new writes to the logical volume subsequent to the receiving of the request for the switching;

initiating a destage scan to commit to the media storage previously non-mirrored writes to the logical volume, wherein the previously non-mirrored writes were received before the new writes;

preventing the switching of the logical volume from the non-mirrored state to the mirrored state and stopping the mirroring of the new writes, in response to a failure of the commit; and allowing the switching of the logical volume from the non-mirrored state to the mirrored state, in response to a successful completion of the commit.

31. The method of claim 28, wherein the one state is a mirrored state and the another state is the non-mirrored state, wherein the code in combination with the computing system is further capable of performing:

continuing mirroring of new writes to the logical volume subsequent to the receiving of the request for the switching;

initiating a destage scan to commit to the media storage previously mirrored writes to the logical volume, wherein the previously non-mirrored writes were received before the new writes;

preventing the switching of the logical volume from the mirrored state to the non-mirrored state in which additional writes are not mirrored, in response to a failure of the commit; and allowing the switching of the logical volume from the mirrored state to the non-mirrored state and stopping the mirroring of the new writes, in response to a successful completion of the commit.

* * * * *